United States Patent [19]
Lewis et al.

[11] 3,777,175
[45] Dec. 4, 1973

[54] SAFETY ARRANGEMENTS FOR ROAD VEHICLES

[75] Inventors: Keith Lewis; Robert Leonard Gleeson, both of Burnley, England

[73] Assignee: Joseph Lucas (Industries) Limited, Birmingham, England

[22] Filed: Apr. 11, 1972

[21] Appl. No.: 242,955

[52] U.S. Cl. .............................. 307/10 SB, 340/272
[51] Int. Cl. ............................................. H02g 3/00
[58] Field of Search....................... 200/82, 85, 86.1, 200/61.88; 180/101; 340/272, 52 E; 307/10 R, 10 SB

[56] References Cited
UNITED STATES PATENTS 3,533,095   10/1970   Collins .............................. 200/85 X
3,363,715   1/1968    Langdon ........................... 200/82 X Primary Examiner—Herman J. Hohauser
Attorney—John C. Holman et al.

[57] ABSTRACT

A safety arrangement for a road vehicle includes a means for detecting the presence of a passenger in a road vehicle comprising a flexible container within a passenger seat in the vehicle, and a fluid pressure operated electrical switch actuable by displacement of fluid from the container. There may also be provided a switch responsive to the vehicle gear selector mechanism, together with a warning device and switches associated with the driver's and passenger's safety harness, the arrangement being such that the warning device is actuated if a gear other than neutral is selected and harness for occupants of the vehicle is not secured.

7 Claims, 4 Drawing Figures

PATENTED DEC 4 1973

3,777,175

SHEET 1 OF 3

SAFETY ARRANGEMENTS FOR ROAD VEHICLES

This invention relates to safety arrangements for road vehicles and has particular reference to the detection of the presence of a passenger to activate a warning circuit to indicate that the passengers safety harness is not fastened.

According to the invention there is provided means for detecting the presence of a passenger in a road vehicle, comprising the combination of a deformable container for inclusion in a passenger seat of the vehicle, and a fluid pressure operated electrical switch having a pressure space connected to said deformable container and actuable by displacement of fluid under pressure from said container.

Figure 1:
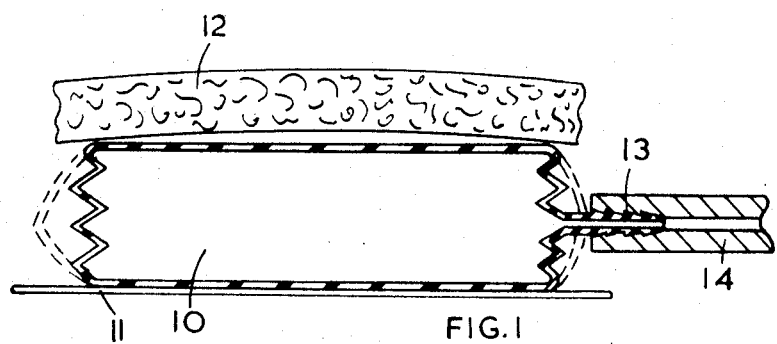
Figure 4:
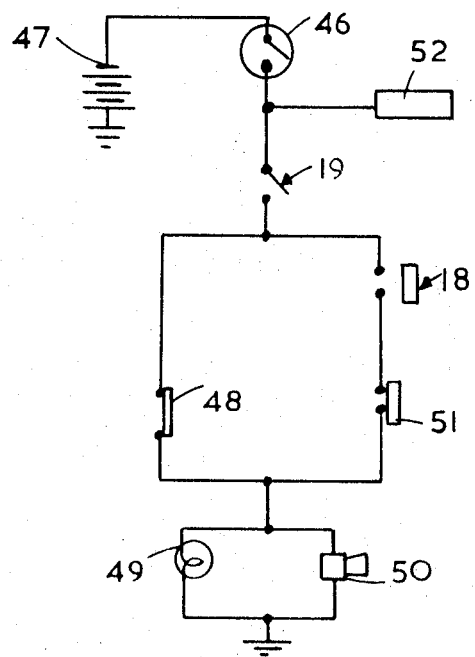
Figure 2:
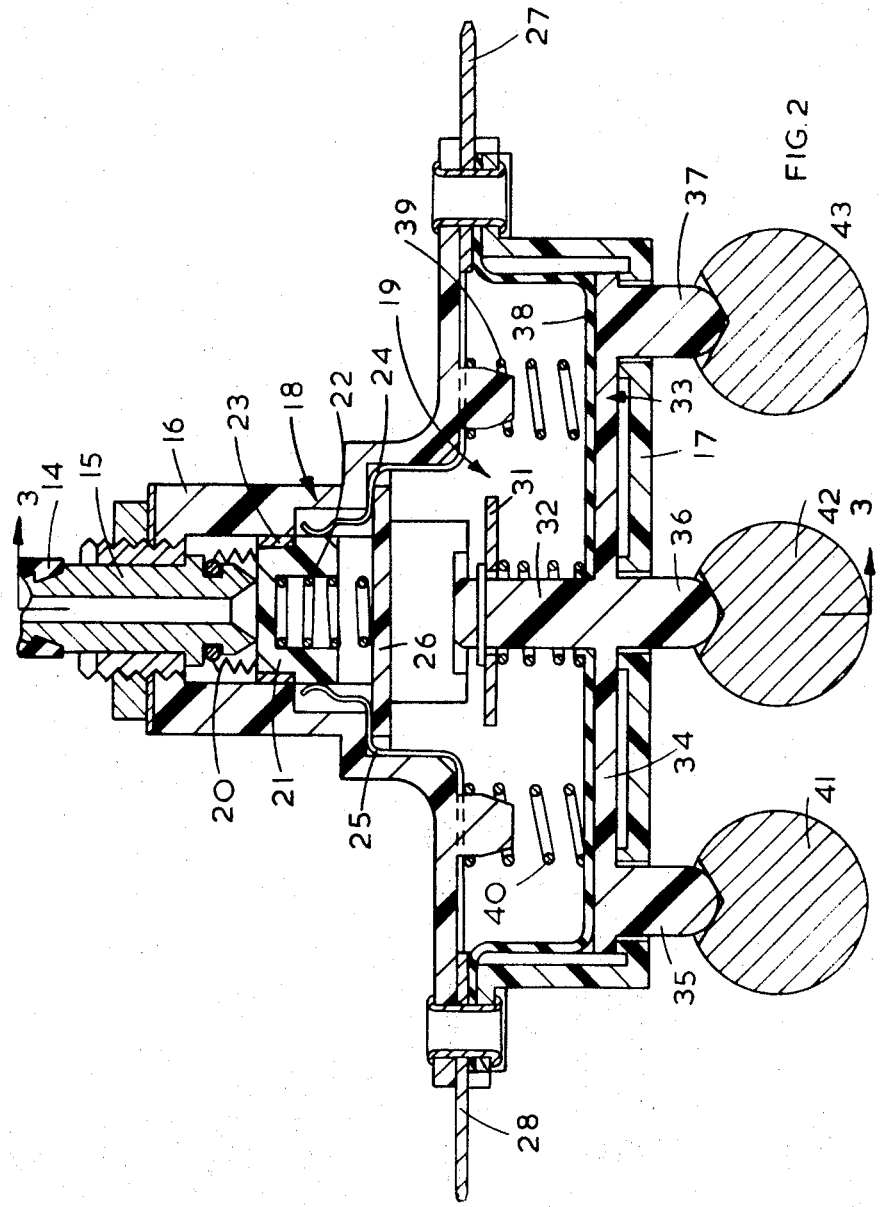
Figure 3:
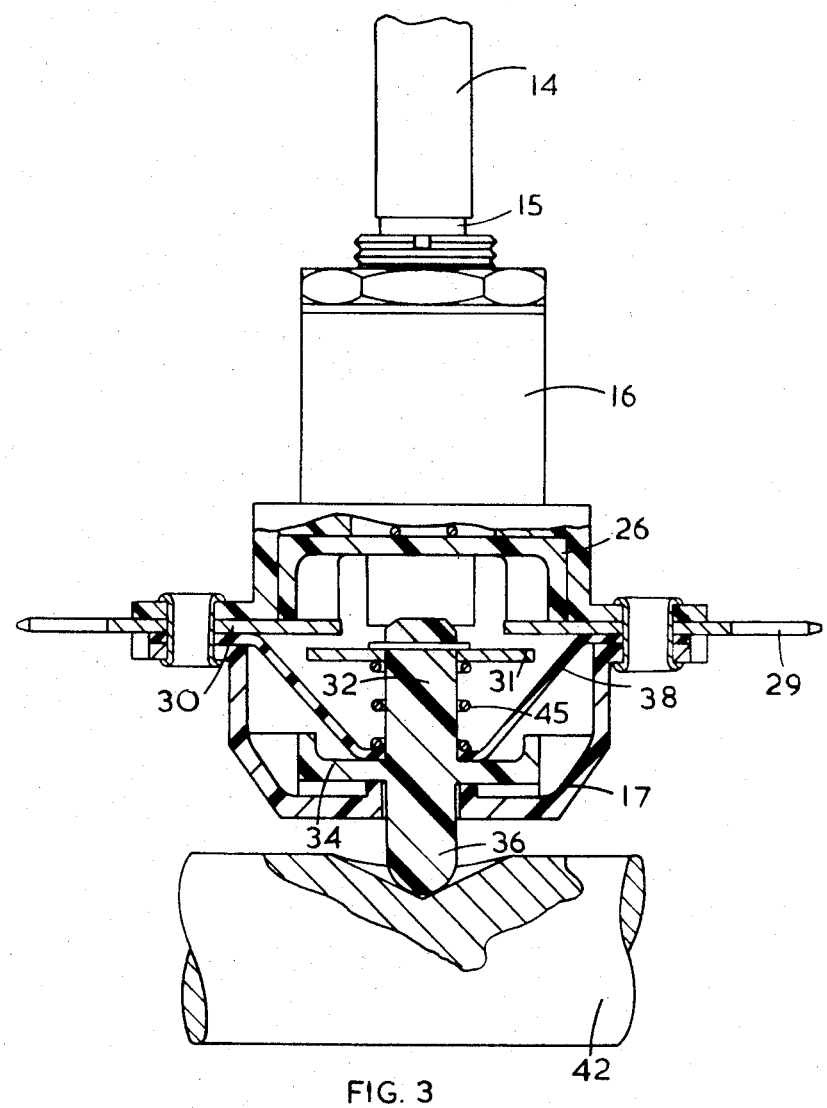

Preferably the pressure switch is remote from the container and is connected thereto by a flexible tube. An example of the invention is illustrated in the accompanying drawings in which:

FIG. 1 is a diagrammatic fragmentary section through the passenger seat of a vehicle, FIG. 2 is a section through a fluid pressure operated electrical switch combined with a gear selector actuated switch, FIG. 3 is a section on line 3—3 in FIG. 2 and FIG. 4 is an electrical circuit diagram of the arrangement.

Referring firstly to FIG. 1 the seat incorporates a flexible container 10 formed of rubber of a synthetic resin material inserted between the webbing 11 and the padding 12 of the seat. At one end the container 10 has a connecter 13 on which a flexible tube 14 is sealingly engaged.

The tube 14 is connected at its opposite end to the switch device shown in FIGS. 2 and 3. This switch device is, in fact, the combination of a fluid pressure operated electrical switch 18 and a switch 19 sensitive to the gear selector mechanism of the vehicle. The pressure switch has a fluid connector 15 on which the tube 14 is sealingly engaged and this is fitted into an opening in one of two parts 16, 17 forming the body of the switch device. Mounted on the end of connector 15 within the body is a sealed rubber or other flexible bellows 20 the interior of which communicates via the tube 14 with the interior of the container 10.

Slidably mounted in the body part 16 is a plunger 21 of insulating material biased by a spring 22 towards the connector 15. The spring 22 abuts against a member 26 fitted into the body part 16. A conductive sleeve 23 is mounted on the exterior of this plunger 21 at one axial end thereof. A pair of spring contact blades 24, 25 engage the plunger on opposite sides and are held in the body by the member 26 and connected to external terminals 27, 28 respectively. The plunger 21 normally occupies the position shown with the sleeve 23 out of contact with the contacts 24, 25. When pressure is applied to the passenger seat, however, air is displaced from the container 10 under pressure so that the bellows 20 is expanded and the plunger moves away from the collector 15. The sleeve 23 then bridges the contacts 24, 25.

The gear selector switch 19, includes a pair of fixed contacts 29, 30 and an annular bridging contact 31 on a stem 32 of a movable contact carrier 33. The carrier 33 has an elongated flat portion 34 extending transversely to the direction in which the contacts 29, 30 are spaced. Three projecting actuating elements 35, 36 and 37 are formed on the member 33 at spaced positions along the portion 34 and project through apertures in the body part 17. A rubber sealing diaphragm 38 has its marginal edge trapped between flanges on the parts 16 and 17 and lies against the portion 34, having an aperture to receive the stem 32. A pair of springs 39 and 40 act between the part 16 of the body and the portion 34 (through the diaphragm 38) on opposite sides of the stem 32.

The actuating elements 35, 36 and 37 co-act respectively with three selectively movable rods 41, 42 and 43 of the gear shift control. When any one of these rods is moved out of its neutral position the contacts 29, 30 are interconnected by the movable contact 31. This contact 31 is loosely mounted on the stem 32 and held against an abutment 44 thereon by a spring 45 so that it can be displaced axially and tilted as required to make face contact with the contacts.

As shown in FIG. 3 the switch 19 is connected to the battery 47 via a switch 46 for an ignition circuit 52. A switch 48 associated with the drivers safety harness is connected to the switch 19 and the switches 46, 48 and 19 in series control a warning light 49 and an audible alarm 50. The switch 18 is connected in series with a switch 51 associated with the passengers safety harness across the switch 48. Thus, when the passenger seat is occupied both of the switches 48 and 51 must be open to prevent operating of the warning light and the audible alarm when the ignition is switched on and a drive gear is selected. The switches 48 and 51 are normally closed but open either when the harness fastening is engaged or when more than a predetermined length of the harness is drawn from a reel on which the harness is stored.

We claim:

1. A safety arrangement for a road vehicle comprising a deformable container for inclusion in a passenger seat of the vehicle, a fluid pressure operated electrical switch having a pressure space connected to said deformable container and actuable by displacement of fluid under pressure from said container, a second switch responsive to the position of a gear selector mechanism for the vehicle, said second switch being closed when a drive gear is selected, a third switch associated with a passengers safety harness for the vehicle, said third switch being closed when the parts of said harness are interengaged, and an electrical warning device, said pressure operated switch and said second and third switches being in series with said warning device, whereby said warning device operates when there is an occupant of said passenger seat, said safety harness parts are not interengaged and a drive gear is selected.

2. A safety arrangement as claimed in claim 1 in which said pressure space is defined by a flexible bellows.

3. A safety arrangement as claimed in claim 1 in which said fluid pressure oeprated switch comprises a plunger axially movable by an increase in pressure in said pressure space, a conductor element on said plunger, a pair of contacts interconnectible by said element in one axial position of said plunger, and biasing means opposing movement of said plunger in response to the pressure in said pressure space.

4. A safety arrangement as claimed in claim 3 in which said elements are interconnected by said plunger when the latter is at an axial end of its movement in response to the pressure in said pressure space.

5. A safety arrangement as claimed in claim 1 in which said second electric switch includes a member engageable with each of a plurality of selectively movable rods in said selector mechanism, and further biasing means urging said member towards engagement with said rods.

6. A safety arrangment as claimed in claim 5 in which said member is movable against said further biasing means to close said further switch when any one of said rods is moved away from a position corresponding to neutral gear.

7. A safety arrangement as claimed in claim 6 which includes a fourth electrical switch associated with a driver's safety harness for the vehicle, said fourth switch being closed when the parts of the associated harness are interengaged, said fourth switch being connected in parallel with said pressure operated switch and said third switch, and an ignition switch for the vehicle, the parallel arrangement being connected in series with said second switch between said warning device and said ignition switch.

* * * * *